(12) United States Patent
Yelahanka Raghuprasad et al.

(10) Patent No.: US 11,398,959 B2
(45) Date of Patent: Jul. 26, 2022

(54) PROACTIVE ROUTING USING PREDICTED PATH SEASONALITY AND TRENDS FOR ENHANCED APPLICATION EXPERIENCE

(71) Applicant: Cisco Technology, Inc., San Jose, CA (US)

(72) Inventors: Mukund Yelahanka Raghuprasad, Milpitas, CA (US); Vinay Kumar Kolar, San Jose, CA (US); Jean-Philippe Vasseur, Saint Martin D'uriage (FR); Grégory Mermoud, Venthône (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/991,717

(22) Filed: Aug. 12, 2020

(65) Prior Publication Data

US 2022/0052927 A1   Feb. 17, 2022

(51) Int. Cl.
*G06F 15/173* (2006.01)
*H04L 41/5025* (2022.01)
(Continued)

(52) U.S. Cl.
CPC .......... *H04L 41/5025* (2013.01); *H04L 43/08* (2013.01); *H04L 45/22* (2013.01); *H04L 45/50* (2013.01)

(58) Field of Classification Search
CPC ..... H04L 41/5025; H04L 43/08; H04L 45/22; H04L 45/50; H04L 43/16; H04L 65/80;
(Continued)

(56) References Cited

U.S. PATENT DOCUMENTS 8,200,454 B2 * 6/2012 Dorneich ........... G06Q 30/0202
                                                       702/179
9,794,145 B2 * 10/2017 Vasseur ................. H04L 41/145
(Continued)

OTHER PUBLICATIONS

C. J. Rankine, G. A. Sanchez-Azofeifa and M. H. MacGregor, "Seasonal wireless sensor network link performance in boreal forest phenology monitoring," 2014 Eleventh Annual IEEE International Conference on Sensing, Communication, and Networking (SECON), 2014, pp. 302-310 (Year: 2014).*

(Continued)

*Primary Examiner* — Taylor A Elfervig
(74) *Attorney, Agent, or Firm* — Behmke Innovation Group LLC; Kenneth J. Heywood; Jonathon P. Western

(57) ABSTRACT

In one embodiment, a device makes a first determination as to whether a time series of a performance metric for a first network path exhibits seasonality. The device makes a second determination as to whether the time series exhibits a trend. The device predicts, based on the first determination and on the second determination, the performance metric for the first network path during a future time period. The device assesses, based on the performance metric predicted for the first network path, whether a measure of application experience will degrade for application traffic sent via the first network path. The device causes the application traffic to be proactively switched to a second network path, when the measure of application experience is expected to degrade.

19 Claims, 12 Drawing Sheets

(51) Int. Cl.
*H04L 43/08* (2022.01)
*H04L 45/00* (2022.01)
*H04L 45/50* (2022.01)

(58) Field of Classification Search
CPC ... H04L 45/28; H04L 41/147; H04L 41/5003; H04L 45/304; H04L 41/5009; H04L 43/062; H04L 43/50; H04L 47/805; H04L 43/0876; H04L 45/00; H04M 3/2227; H04W 40/02
USPC .......................................................... 709/224
See application file for complete search history.

(56) References Cited

U.S. PATENT DOCUMENTS

| | | | | |
|---|---|---|---|---|
| 10,862,788 | B2* | 12/2020 | Samadi | H04L 41/145 |
| 10,897,424 | B1* | 1/2021 | Dhanabalan | H04L 45/70 |
| 10,915,830 | B2* | 2/2021 | Garvey | G06N 7/005 |
| 2004/0218582 | A1 | 11/2004 | Kennedy et al. | |
| 2006/0050736 | A1* | 3/2006 | Segel | H04B 7/18591 |
| | | | | 370/542 |
| 2009/0018798 | A1* | 1/2009 | Dorneich | G06Q 30/0202 |
| | | | | 702/179 |
| 2009/0168653 | A1 | 7/2009 | St. Pierre et al. | |
| 2015/0195192 | A1 | 7/2015 | Vasseur et al. | |
| 2015/0289146 | A1* | 10/2015 | Ouyang | H04L 47/127 |
| | | | | 370/252 |
| 2016/0248661 | A1 | 8/2016 | Dasgupta et al. | |
| 2018/0060737 | A1* | 3/2018 | Ezry | G06N 5/022 |
| 2018/0123901 | A1* | 5/2018 | Yermakov | G06N 20/00 |
| 2018/0359172 | A1* | 12/2018 | Yadav | H04L 41/147 |
| 2019/0068482 | A1* | 2/2019 | Rafique | H04L 45/28 |
| 2019/0197413 | A1* | 6/2019 | Veasey | G06F 16/252 |
| 2020/0084142 | A1* | 3/2020 | Bochkar | H04L 45/70 |
| 2021/0224833 | A1* | 7/2021 | Lei | G06N 5/04 |
| 2022/0022066 | A1* | 1/2022 | Anand Pushkala | H04L 41/145 |

OTHER PUBLICATIONS

O. Ibidunmoye, A. Rezaie and E. Elmroth, "Adaptive Anomaly Detection in Performance Metric Streams," in IEEE Transactions on Network and Service Management, vol. 15, No. 1, pp. 217-231, Mar. 2018 (Year: 2018).*

Cheng Guang, Gong Jian and Ding Wei, "Nonlinear-periodical network traffic behavioral forecast based on seasonal neural network model," 2004 International Conference on Communications, Circuits and Systems (IEEE Cat. No. 04EX914), 2004, pp. 683-687 (Year: 2004).*

Hyndman, et al., "6.6 STL Decomposition", Forecasting: Principles and Practice, online: https://otexts.com/fpp2/stl.html, Apr. 2018, 3 pages.

Choudhury, et al., "Two use cases of machine learning for SDN-enabled ip/optical networks: traffic matrix prediction and optical path performance prediction [Invited]", IEEE/OSA Journal of Optical Communications and Networking, vol. 10, Issue: 10, Oct. 2018, 11 pages, IEEE.

Burba, Davide, "An Overview of Time Series Forecasting Models", Towards Data Science, Oct. 2019, 20 pages, Medium.

Makridakis, et al., "The M4 Competition: 100,000 Time Series and 61 Forecasting Methods", International Journal of Forecasting, vol. 36, No. 1, Jan.-Mar. 2020, pp. 54-74, Elsevier. B.V.

Lim, et al., "Time Series Forecasting with Deep Learning: A Survey", online: https://arxiv.org/pdf/2004.13408.pdf, Apr. 2020, 12 pages, The Royal Society Publishing.

* cited by examiner

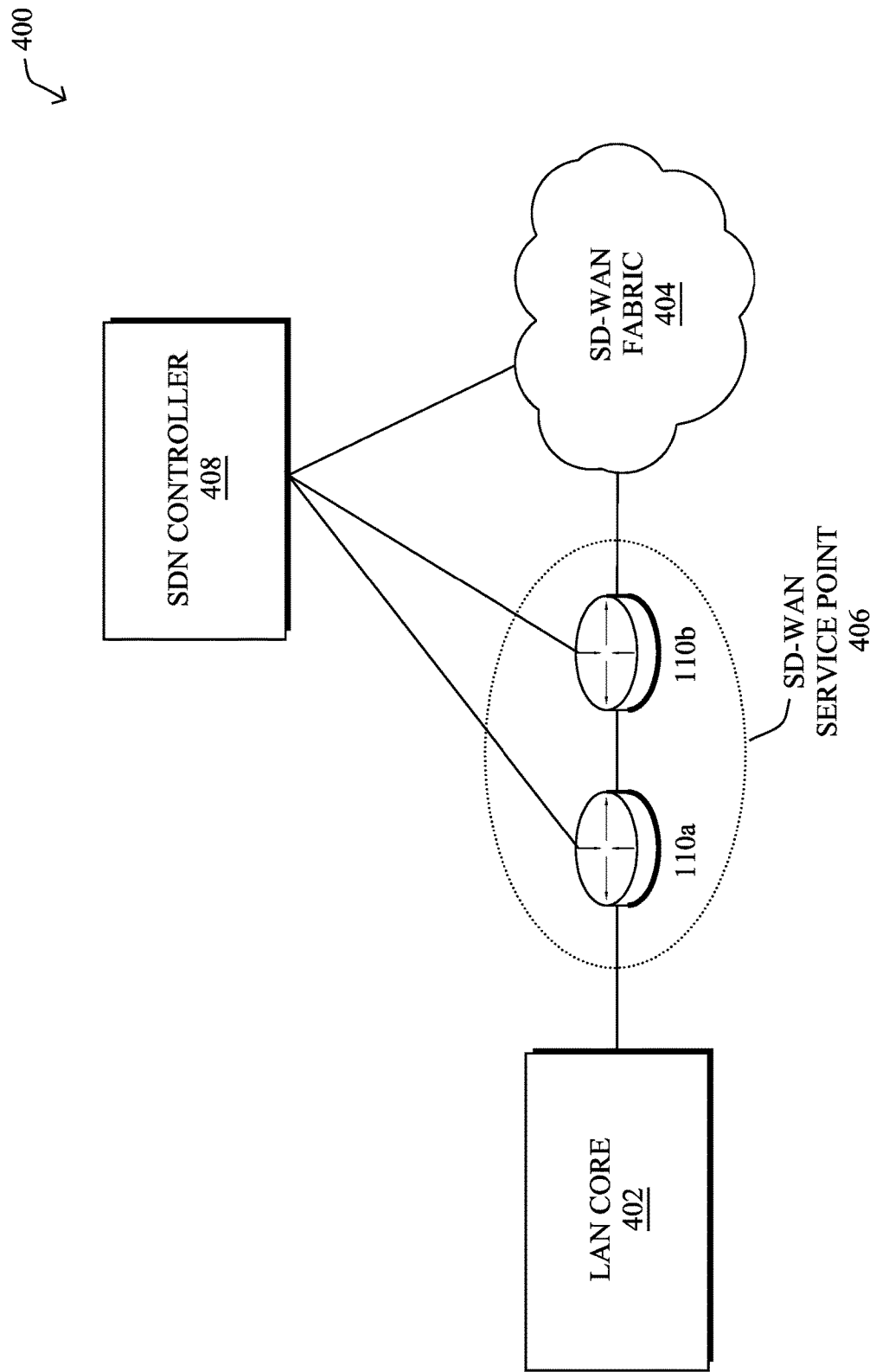

US 11,398,959 B2

PROACTIVE ROUTING USING PREDICTED PATH SEASONALITY AND TRENDS FOR ENHANCED APPLICATION EXPERIENCE

TECHNICAL FIELD

The present disclosure relates generally to computer networks, and, more particularly, to proactive routing using predicted path seasonality and trends for enhanced application experience.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

With the emergence of technologies such as Infrastructure as a Service (IaaS) and Software as a Service (SaaS), the resulting virtualization of services has led to a dramatic shift in the traffic loads of many large enterprises. Indeed, many SaaS services can now be reached in a typical deployment via a number of different network paths. However, path selection can also greatly impact the quality of experience (QoE) associated with a given SaaS application. For instance, delays, losses, or jitter along the routing path can lower the QoE of the SaaS application. However, the use of multiple paths can lead to a strong variation of SLA and QoE.

Today, many routing decisions do not take into account the QoE associated with a given SaaS application and rely on static SLAs set for the current path and sending probes down the path to test whether it satisfies these SLAs. For instance, if the measured losses along the current path exceed an SLA threshold, the SaaS application traffic may be rerouted onto a different path. This approach, though, relies on user experience to set the SLA thresholds, which has been shown to lead to highly diverse sets of SLA thresholds for the same application. In addition, this approach is reactive in nature, meaning that the traffic will not be rerouted until the QoE of the application is potentially affected.

BRIEF DESCRIPTION OF THE DRAWINGS

FIG. 4 illustrates an example software defined network (SDN) implementations.

DESCRIPTION OF EXAMPLE EMBODIMENTS

Overview

Figure 1A:
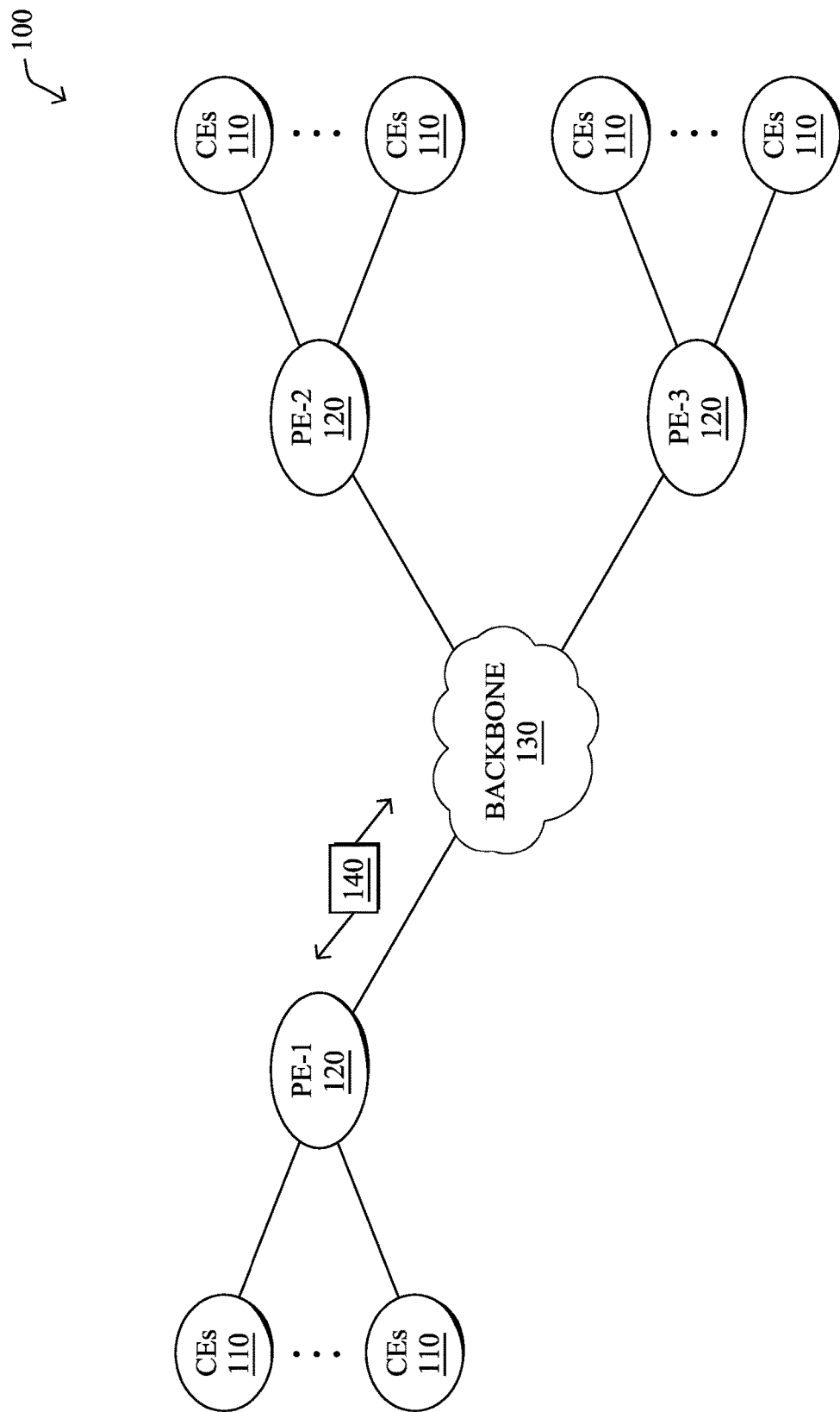
FIGS. 1A-1B illustrate an example communication network.

According to one or more embodiments of the disclosure, a device makes a first determination as to whether a time series of a performance metric for a first network path exhibits seasonality. The device makes a second determination as to whether the time series exhibits a trend. The device predicts, based on the first determination and on the second determination, the performance metric for the first network path during a future time period. The device assesses, based on the performance metric predicted for the first network path, whether a measure of application experience will degrade for application traffic sent via the first network path. The device causes the application traffic to be proactively switched to a second network path, when the measure of application experience is expected to degrade.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network is backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected is to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
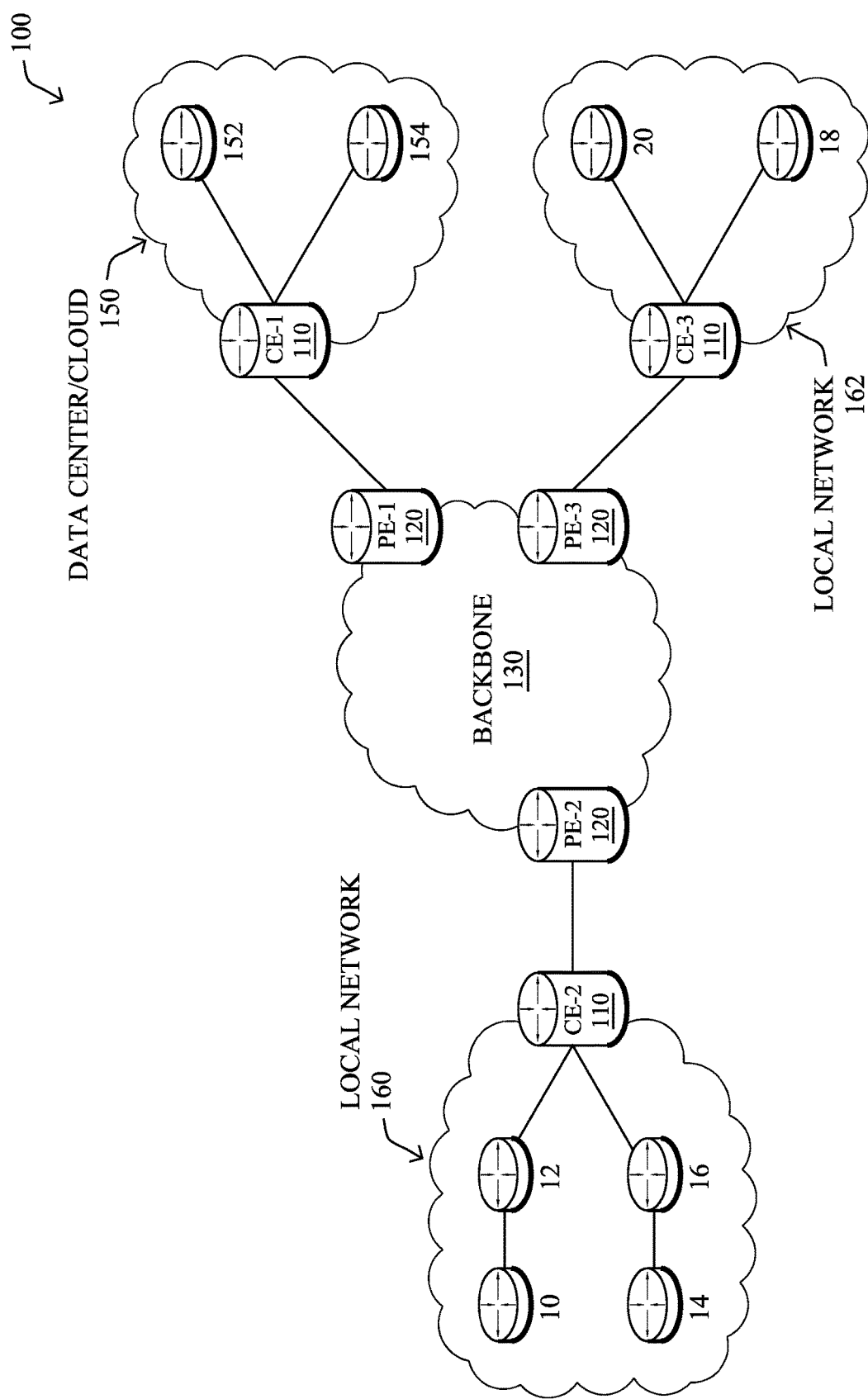

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud 150 on top of the various underlying connections. Another feature of SD-WAN is centralized management by a supervisory service that can monitor and adjust the various connections, as needed.

Figure 2:
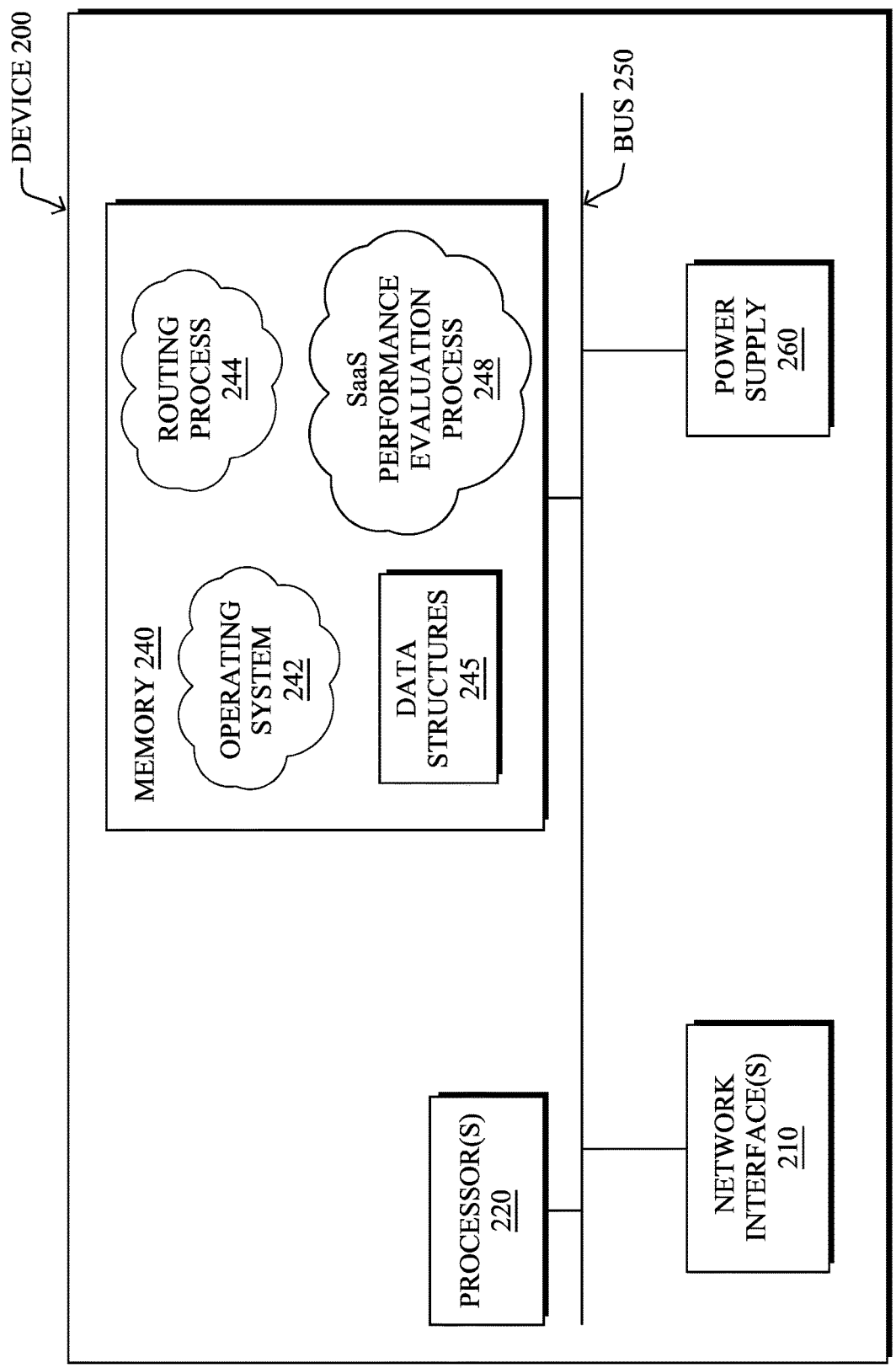
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The is network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a path evaluation process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, path evaluation process 248 may also include computer executable instructions that, when executed by processor(s) 220, cause device 200 to perform the techniques described herein. To do so, in some embodiments, path evaluation process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, path evaluation process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different quality of service (QoS) at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
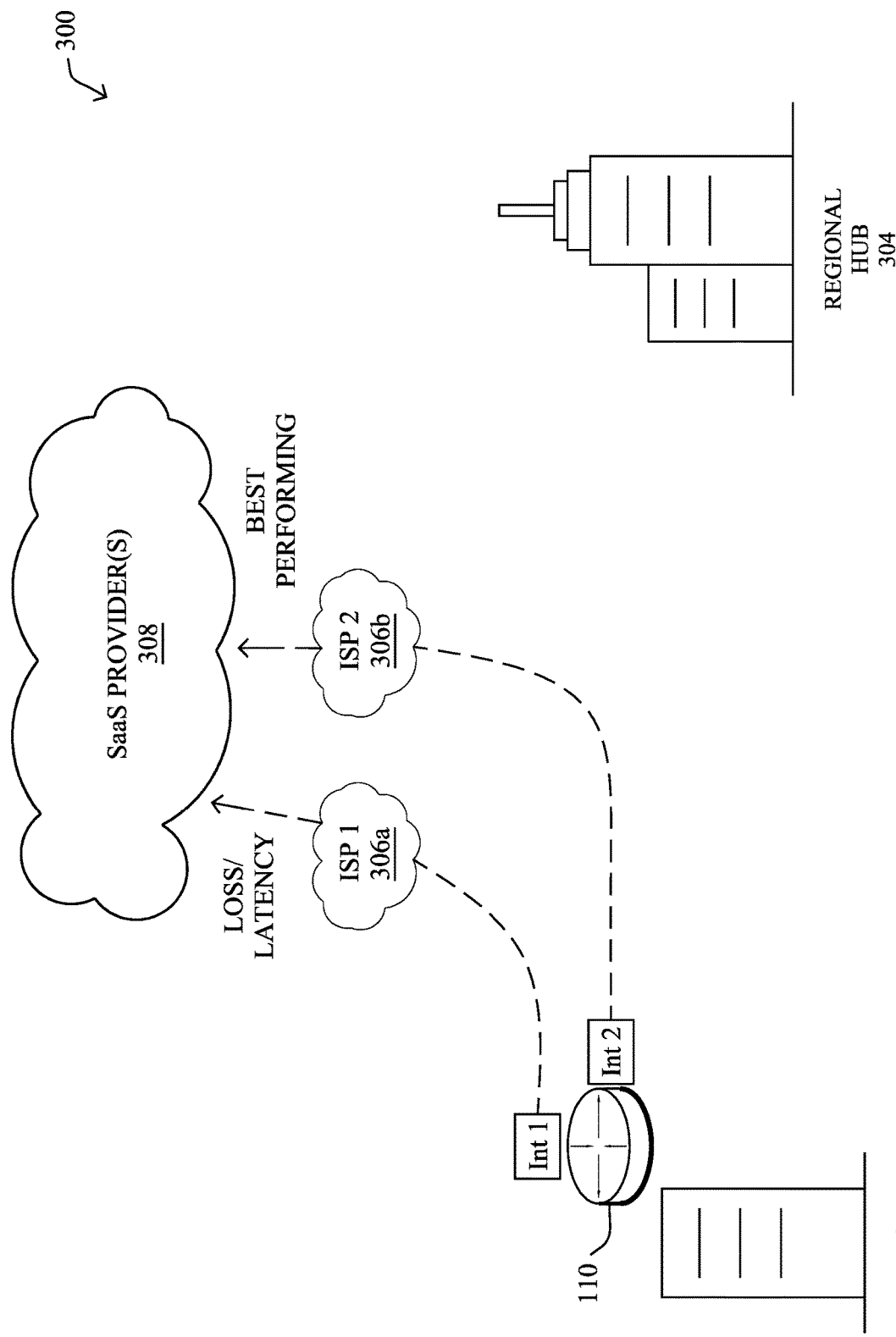
FIGS. 3A-3B illustrate example network deployments.
Figure 3B:
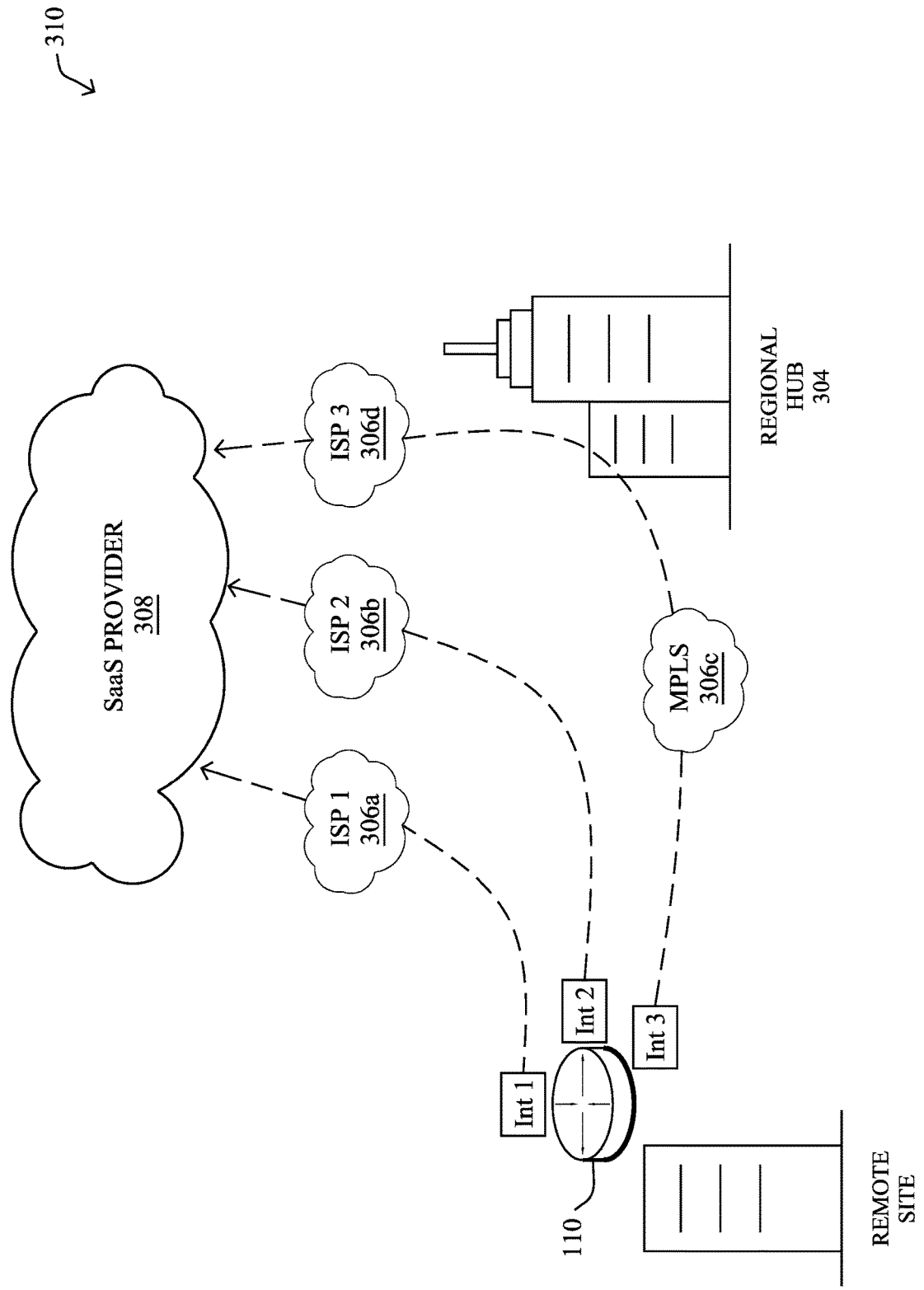

FIGS. 3A-3B illustrate example network deployments 300, 310, respectively. As shown, a router 110 (e.g., a device 200) located at the edge of a remote site 302 may is provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo. accessing SaaS provider(s) 308 via Zscaler or Umbrella services, and the like.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B and the like.

As noted above, the dynamics of Internet traffic has changed dramatically in recent years, in part due to the proliferation of SaaS applications. Traditionally, network topologies would be computed using traffic matrices thanks to off-line research operational tools allowing for traffic engineering (e.g., using IP, MPLS, etc.). However, with the emergence of SaaS applications, many large networks are now embracing a SaaS model for their critical applications, such as Box, Office 365, SAP, and the like. Thus, it becomes common for the in-house traffic to be sent to an internal data center, whereas the SaaS traffic is sent to various clouds. Such SaaS traffic may itself be sent to the private data center, to a security provider such as ZScaler or Umbrella, a 'Colo,' or even directly to the SaaS provider from a branch office using a VPN such as AnyConnect with "split tunneling," to avoid carrying such traffic on costly private WAN links.

One of the consequences of the emergence of SaaS traffic is that SaaS traffic tends to use a number of paths that may themselves exhibit various characteristics/key performance indicators (KPIs) in terms of QoS (e.g., loss, delay, jitter, throughput, etc.), thus leading to a strong variation of SLAs and user satisfaction. Typically, this is dealt with by specifying static SLAs on a per application basis using templates. For instance, one SLA template may specify that a tunnel is eligible to carry traffic for a voice application if it exhibits loss <3%, delay <150 ms, etc. Then, for each path, tunnel probes may be used to measure the path characteristics and traffic is routed according to those SLA. Unfortunately, such an approach is reactive in nature, meaning that a re-route only occurs after a problem exists. In some cases, SLA measurements can take up to one hour to act on the routing decision, to avoid traffic oscillations. In the meantime, though, the QoE of the application will be impacted.

Many paths in the Internet are seasonal whereby a given network path experiences unfavorable behavior in regular intervals. This presents some opportunity' to leverage machine learning, to detect this seasonality and determine whether a given path will be subject to SLA violation. While the root cause for such phenomenon is complex and requires non-scalable solutions to solve, seasonality can be studied and predicted.

Proactive Routing Using Predicted Path Seasonality and Trends for Enhanced Application Experience The techniques introduced herein improve the application experience for a user by predicting unfavorable seasonal behavior along various paths and using these predictions to trigger proactive path routing, to ensure an acceptable level of service. Doing so also addresses the issue of estimating the sensitivity of the QoE of the application to a particular network KPI, allowing the system to trigger proactive actions only when the KPI concerned presents seasonal, unfavorable behavior. In further aspects, the techniques herein also allow for the evaluation of behavioral trends exhibited by a path. For instance, statistical techniques may be used to determine whether a tunnel or path trend can be detected, thus leading to more predictability of potential SLA violation.

Illustratively, the techniques described herein may be performed by hardware, software, and/or firmware, such as in accordance with the path evaluation process 248, which may include computer executable instructions executed by the processor 220 (or independent processor of interfaces 210) to perform functions relating to the techniques described herein (e.g., in conjunction with routing process 244).

Specifically, according to various embodiments, a device makes a first determination as to whether a time series of a performance metric for a first network path exhibits seasonality. The device makes a second determination as to whether the time series exhibits a trend. The device predicts, based on the first determination and on the second determination, the performance metric for the first network path during a future time period. The device assesses, based on the performance metric predicted for the first network path, whether a measure of application experience will degrade for application traffic sent via the first network path. The device causes the application traffic to be proactively switched to a second network path, when the measure of application experience is expected to degrade.

Figure 5:
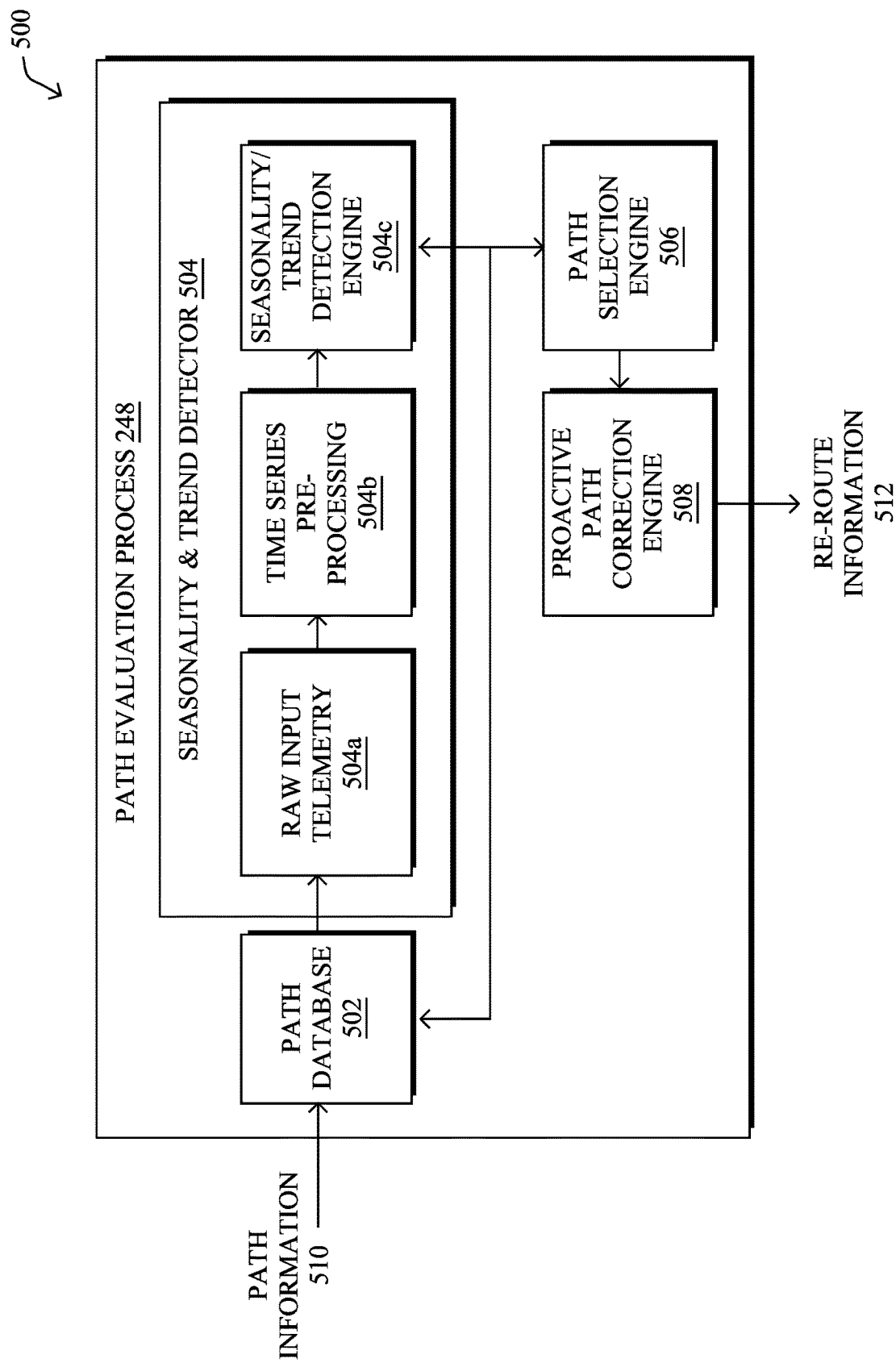
FIG. 5 illustrates an example architecture for evaluating path performance.

Operationally, FIG. 5 illustrates an example architecture 500 for evaluating path performance, according to various embodiments. As shown, path evaluation process 248 may include any or all of the following components: a path database 502, a seasonality & trend detector 504, a path selection engine 506, and/or a proactive path correction engine 508. As would be appreciated, the functionalities of these components may be combined or omitted, as desired. In addition, these components may be implemented on a singular device or in a distributed manner. For instance, these components may be executed by a particular router or other networking device, an SDN controller, or the like. Conversely, certain components of path evaluation process 248 may be executed on-box by a router or other networking device, while other components may be executed by a supervisory, such as an SDN controller. In the distributed case, the combination of executing devices can be viewed as their own singular device for purposes of executing path evaluation process 248.

Path database 502 collects path information 510 regarding the various existing paths and their corresponding KPIs, such as loss, latency, jitter, etc. To obtain path information 510, network probes may be sent along the paths and the resulting path is information 510 used to build and refresh path database 502. In one embodiment, path information 510 can be collected via heart-beat messages such as BFD probes in an SD-WAN. In another embodiment, path information 510 can be captured by sending HTTP ping messages to the application endpoints, such as SaaS application servers, to provide estimates of the loss, latency, and jitter along these paths. A plurality of probes can also be used to refine the paths and their KPIs such that a query to path database 502 identifies all paths between a pair of IP addresses, as well as the KPIs of the paths that represent the quality of the paths. In addition to maintaining the path KPIs that are measured, path database 502 may also maintains the predicted characteristics of a path, such as seasonality and/or trends, as described in greater detail below.

In various embodiments, path database 502 may be a centralized or distributed engine, such as a cloud-hosted database, part of an SDN controller for an SD-WAN or in communication therewith, or the like, allowing routers or end-devices to query for path information. In another embodiment, path database 502 may be configured to push paths to certain routers if the KPIs or seasonality/trend. predictions of a path changes.

According to various embodiments, seasonality & trend detector 504 may leverage machine learning to predict the seasonal periods and/or trends of the KPIs for a given path, using the path information 510 collected in path database 502. As noted previously, seasonality & trend detector 504 may be executed in a centralized manner in conjunction with path database 502 or, alternatively, may be executed on a networking device, such as an edge device. In general, seasonality & trend detector 504 takes as input the various network telemetry KPIs and evaluates their seasonality and/or trending behaviors. This analysis may also entail evaluating the extent of the seasonality or trend behavior observed through various metrics.

During execution, seasonality & trend detector 504 may take as input the raw input telemetry 504a from path database 504 and apply time series pre-processing 504b to it. Pre-processing 504b may entail performing actions like aggregation or data-cleaning. In one embodiment, pre-processing 504b may entail aggregating highly granular telemetry to more acceptable aggregations using aggregation operations like median, mean, percentile. The aggregation and cleaning of raw input telemetry 504a prevents the noise from affecting the seasonality/trend analysis by seasonality/trend detection engine 504c.

Figure 6A:
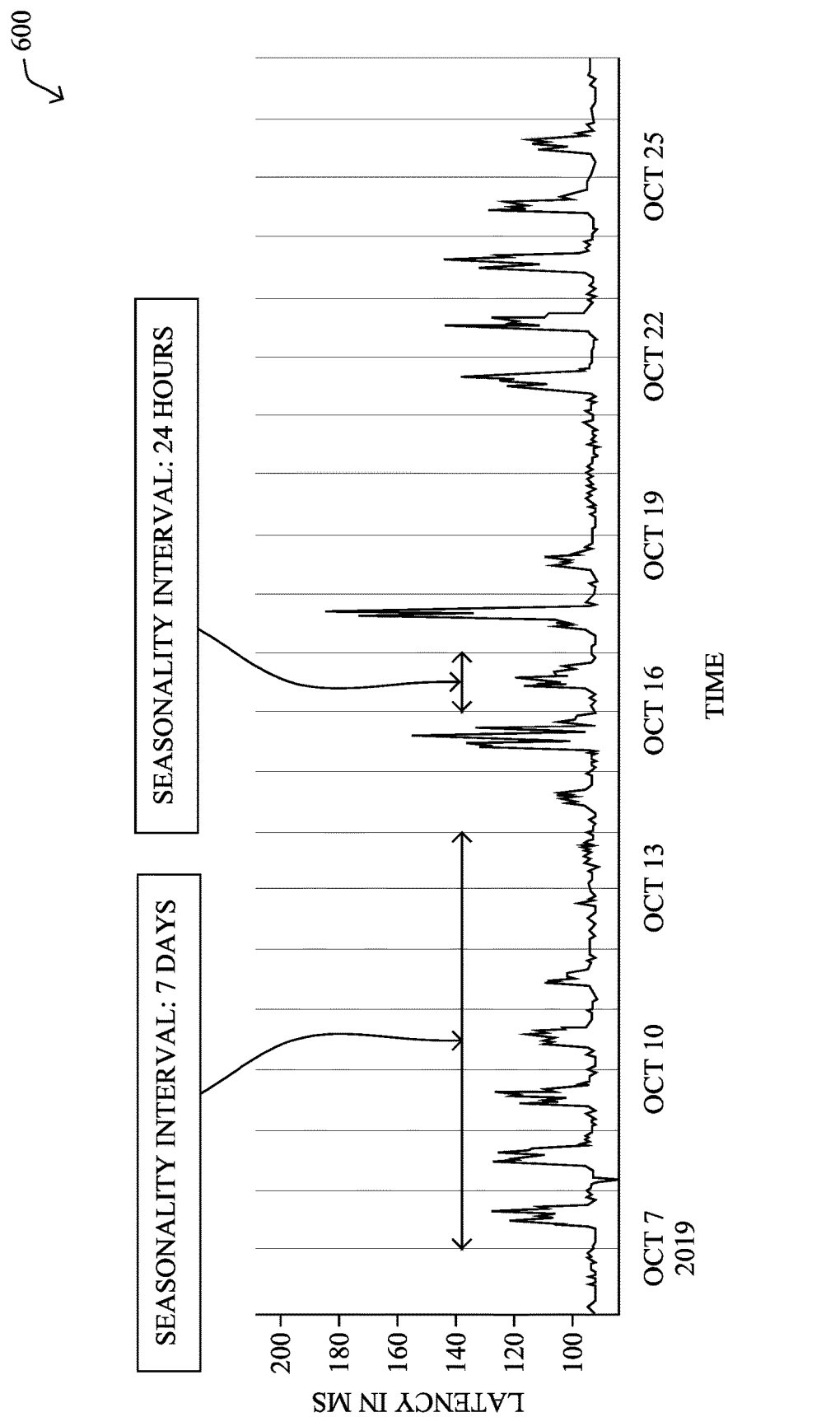
FIGS. 6A-6C illustrate example plots of path behavior.

As would be appreciated, seasonality is a phenomenon whereby a certain pattern repeats itself in the telemetry/KPI values at regular intervals. By way of example, FIG. 6A illustrates a plot 600 showing the seasonality of the latency exhibited by a particular SD-WAN tunnel. Notably, plot 600 shows two intervals of seasonality: weekly seasonality that appears every seven days and daily seasonality that appears every twenty-four hours.

Seasonality/trend detection engine 504c may detect seasonal patterns in the KPIs and output metrics such as the seasonality interval (e.g., hourly, daily, weekly, etc.), seasonality significance, or the like. In various embodiments, seasonality/trend detection engine 504c may achieve this using statistical approaches like seasonality-trend decomposition, partial auto-correlation functions (PACFs), power spectrum using Fast Fourier Transforms (FFTs), etc.

Figure 6B:
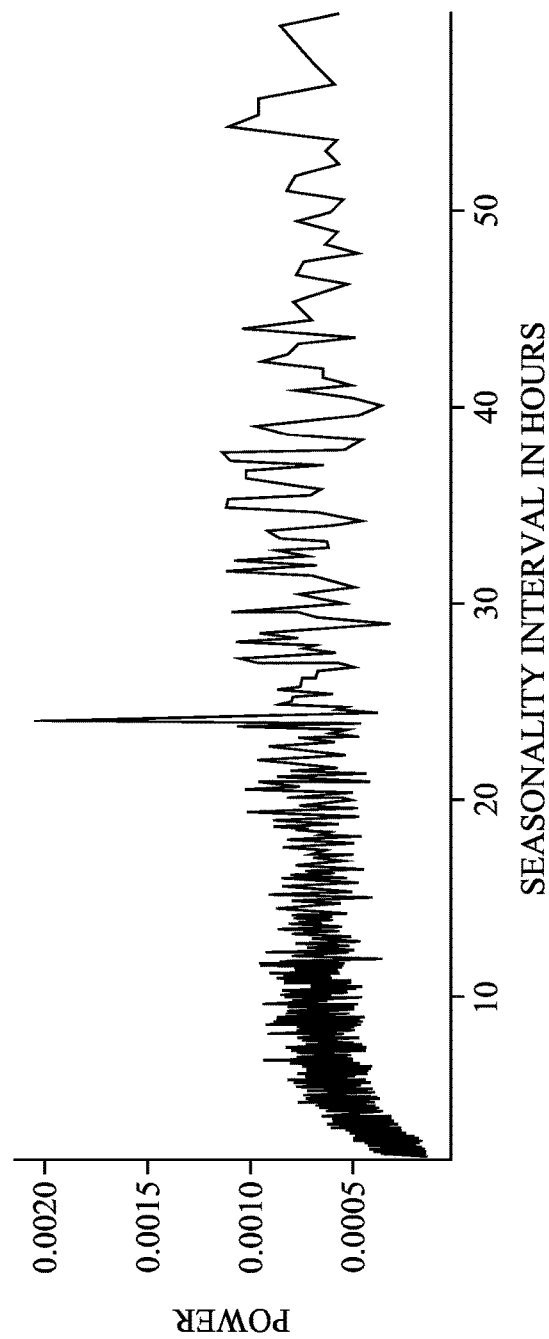
Figure 6C:
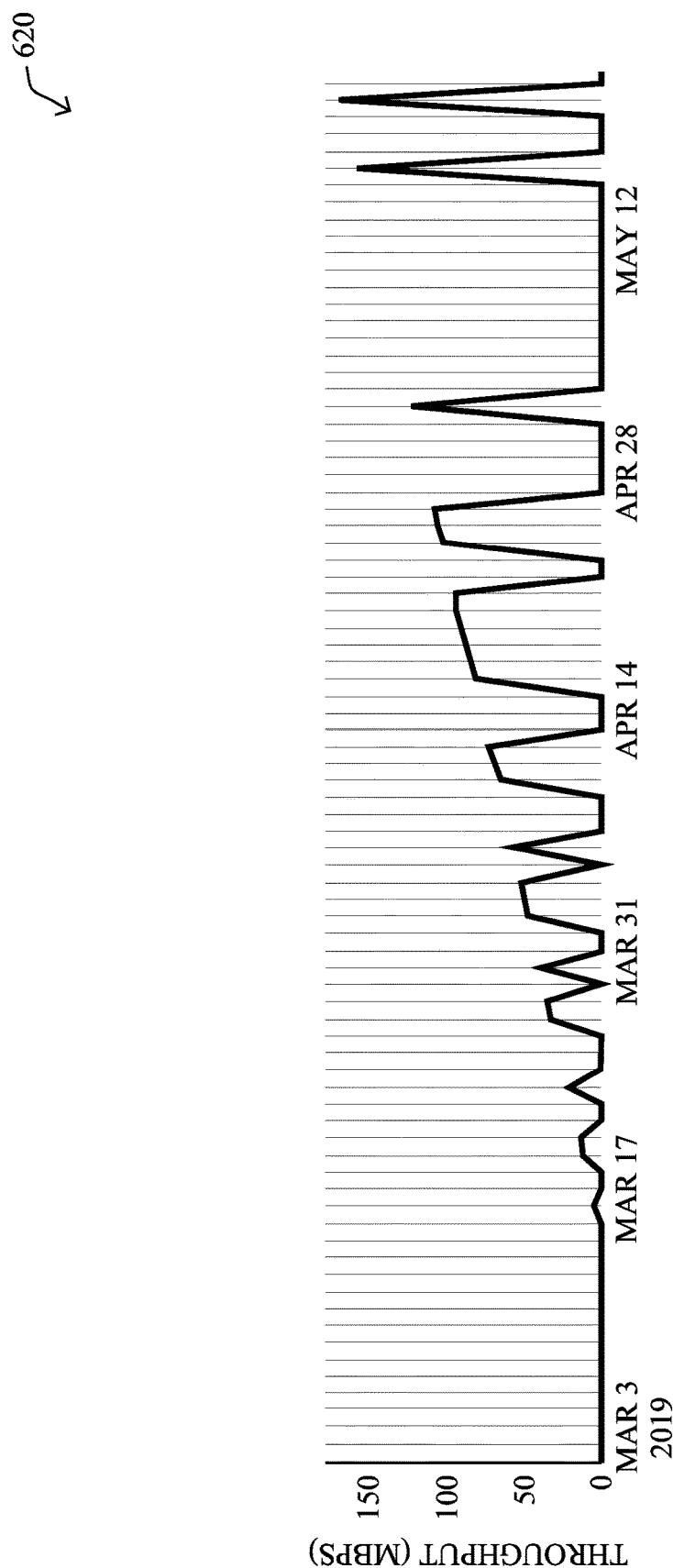

For example, FIG. 6B illustrates an example plot 610 of the power spectrum of a time-series where the power is shown on the y-axis and the power at different lags in hours is shown on the x-axis. From plot 610, it can be seen that the time-series has a peak power at around 24 hours, indicating that time-series has a daily seasonality.

Referring again to FIG. 5, in addition to identifying the seasonality period, seasonality/trend detection engine 504c may compute the amount of signal jumps and the length of time during which the signal seasonally jumps using techniques such as Peak-finding algorithms. In another embodiment, seasonality/trend detection engine 504c may leverage a classification or regression model that outputs seasonality labels when the time-series is seasonal. In a further embodiment, seasonality/trend detection engine 504c may use deep learning or neural-network based approaches to implement an unsupervised machine learning model that can encode the time-series into a latent space that filters out time-series with seasonal patterns.

Regardless of the approach taken, seasonality/trend detection engine 504c may output information indicative of whether a seasonal pattern was observed in raw input telemetry 504. If so, seasonality/trend detection engine 504c may indicate the identified seasonality interval and/or the significance value/confidence score associated with the identified interval.

As would be appreciated, a trend is a long-term phenomenon where the KPI value steadily increases or decreases over the observed time-range. For instance, consider example plot 620 shown in FIG. 6B. In plot 620, the measured throughput of an SD-WAN tunnel in Mbps is plotted over time. From plot 620, it can be seen that the throughput is steadily increasing over time, indicating a trending pattern.

Referring again to FIG. 5, seasonality/trend detection engine 504c may also identify any trends exhibited by any of the KPIs of a particular path, based on their time-series, according to various embodiments. In one embodiment, seasonality/trend detection engine 504c may do so by extracting the trends Seasonal and Trend decomposition using Loess (STL) decomposition, where Loess is a method for estimating non-linear relationship. Once extracted, seasonality/trend detection e 504c can then detect a monotonic trend using simple statistics, if a tend exists.

In another embodiment, seasonality/trend detection engine 504c may detect KPI trends using a classification or regression model based on a neural network or deep learning architecture.

Based on its trend analysis, seasonality/trend detection engine 504c may output data indicative of whether a trend was detected in the KPI telemetry and the extent/steepness of the trend. Additionally, seasonality/trend detection engine 504c may also output a significance value/confidence score associated with the detected trend.

Accordingly, seasonality/trend detection engine 504c may output any or all of the following data fields:
  Seasonal Indicator—this may take the form of a Boolean value or other indicator indicating whether seasonality exists for a given path.
  Peak Interval—the predicted length of the identified seasonal pattern.
  Peak Height—the predicted amount of jump in the time-series during seasonal peaks.
  Seasonality Significance—the statistical significance or confidence associated with the detected seasonal pattern.
  Trend Indicator—this may take the form of a Boolean value or other indicator indicating whether the path exhibits a KPI trend.
  Trend Slope—the steepness of the identified trend.
  Trend Significance—the statistical significance or confidence associated with the detected trend pattern.

Seasonality/trend detection engine 504c may push the above metrics to path database 502 periodically or at other times, to allow path selection engine 506 and proactive path correlation engine 508 to perform closed-loop control and/or correlate them with other KPIs.

Another potential component of path evaluation process 248 is path selection engine 506 that is responsible for choosing the path that best meets the networking requirement of an (SaaS) application, according to various embodiments. In various embodiments, path selection engine 506 may be executed in a centralized manner, to select the 'best' path between two points for the traffic of an application, or may be executed directly by the routers or other end-devices.

In one embodiment, path selection engine 506 may query path database 502 to obtain a list of all the possible paths between a given pair of IP addresses. This provides information about the path KPIs and the predicted seasonality and trends for each path. In another embodiment, path selection engine 506 may subscribe to path database 502, so that active KPIs and predictions are pushed to it for all paths between a pair of IP addresses.

After collecting the list of paths from path database 502, path selection engine 506 may utilize the predicted seasonality and trend parameters to estimate what will be the KPIs of the path in for the next time-period, in various embodiments. For example, path selection engine 506 may estimate the seasonal loss and latency predictions on a path for a time period [t, t+d] by any or all of the following: (a) checking whether the path exhibits seasonal behavior and its seasonality confidence/significance is high; (b) estimating whether the peak interval of the seasonal behavior will lie within the given time-period [t, t+d]; and/or (c) quantifying the amount of loss or latency jumps. Similarly, path selection engine 506 may use the trend estimates (e.g., slope) to predict the effect of trends on the path KPIs.

Figure 7:
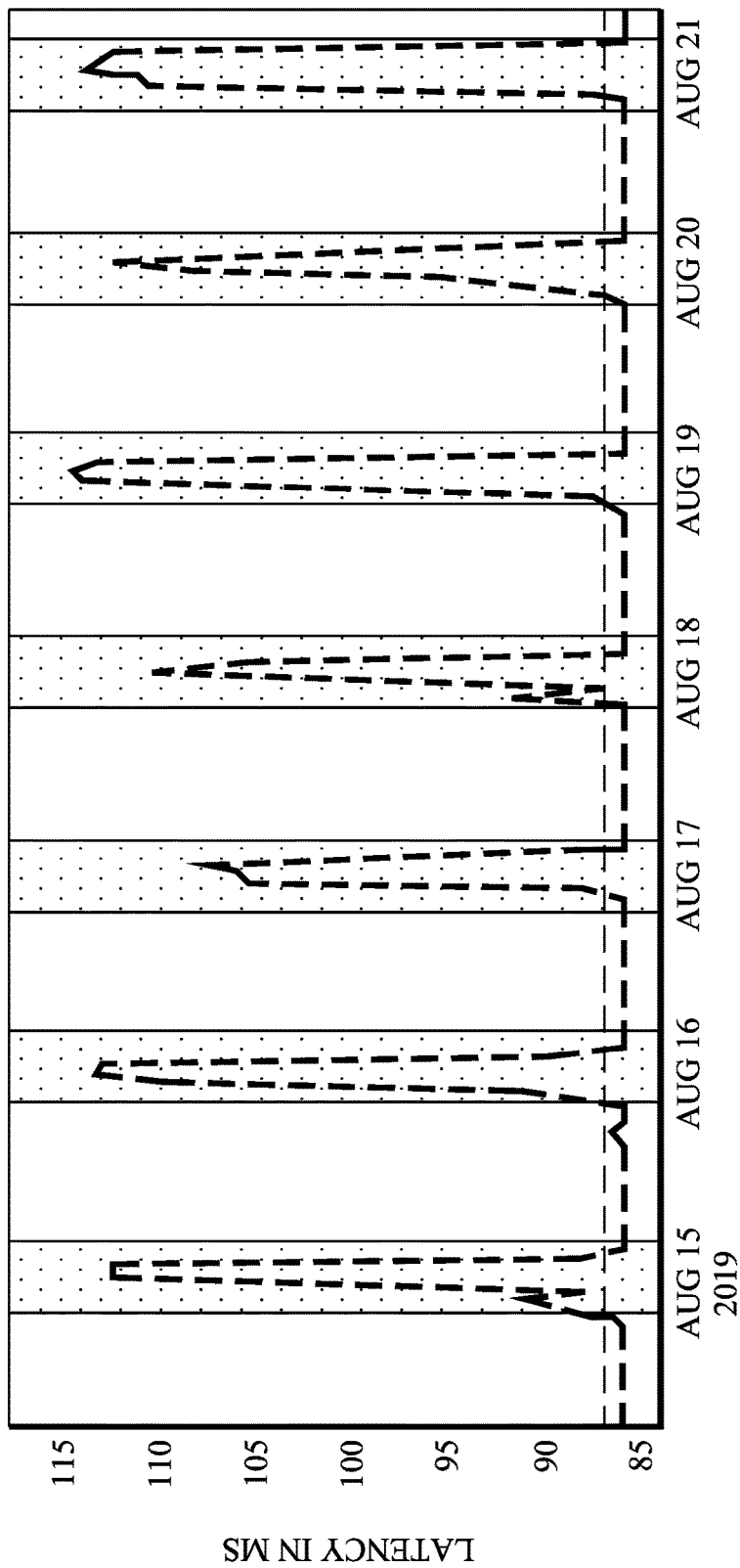
FIG. 7 illustrates an example plot of predicted latency along a path.

To better illustrate the operation of path selection engine 506, FIG. 7 illustrates an example plot 700 showing the latency of two tunnels between the same pair of edge routers over time: a first tunnel over a business Internet connection (biz-internet) and a second tunnel over a public Internet connection (public-internet). From plot 700, it can be seen that the public-internet tunnel has a highly seasonal latency spike. While path selection engine 506 may choose to utilize the public-internet tunnel during most times, during seasonal spikes, path selection engine 506 may opt to switch the application traffic to the biz-Internet tunnel.

Referring yet again to FIG. 5, the above techniques allow path selection engine 506 to determine the expected KPI values for a given path. In one embodiment, path selection engine 506 may select the path on which to route the application traffic that currently has the lowest loss and latency. For example, path selection engine 506 may rank the possible paths between the edge routers based on the predicted values of loss and then latency, and then select the top-ranked path for routing the application traffic. Of course, the heuristics that path selection engine 506 may use to select the 'best' path for an application can vary, depending on the needs of the application. For instance, one such heuristic may define the 'best' path as the one with:
  a. Lowest maximum (loss) and then lowest mean(loss) over the time-period;
  b. A weighted function of mean/max KPIs;
  c. Or a combination of the above.

In another embodiment, path selection engine 506 may fetch the SLA templates for different categories of applications from the networking configurations or previously defined default SLAs for several application-classes. Each SLA template defines the acceptable range of KPIs where the application behaves the best. For example, an SLA template for a voice application is often set at loss<1% and latency<150 ms and jitter<100 ms.

Based on the application-class and the corresponding SLA template, path selection engine 506 may select the best route that minimizes any SLA violations, in one embodiment. A combination of SLA template and the heuristics above can also be used by path selection engine 506 to select the best path.

In yet another embodiment, path selection engine 506 may also consider the stability of the path. For example, path selection engine 506 may only consider a given path for routing the application traffic if: (a) the predicted KPIs of the new best path are significantly greater than predicted KPIs of the current path; or (b) SLA violations occur for long intervals of time (e.g., for more than 3 minutes or other defined interval). This avoids routing oscillations whereby the 'best' path switches from one path to another. To avoid this, path selection engine 506 may employ an oscillation avoiding techniques, such as the ones used to prevent BGP route oscillations.

Finally, path evaluation process 248 may also include a proactive path correction engine 508, which may be executed either centrally or on a networking device. In various embodiments, proactive path correction engine 508 may use the information to generated by path selection engine 506 to initiate corrective measures in the network, such as by issuing re-route information 512. For instance, based on the above information, proactive path correction engine 508 may determine whether the current path will lead to an unfavorable application experience and, if so, proactively reroute the traffic of the application onto the path selected by path selection engine 506, to guarantee a better application experience for a certain amount of time.

In another embodiment, the end-device or the router can register to receive a trigger when the path will degrade. For example, if the path has seasonality with high peak jumps, then proactive path correction engine 508 may provide a trigger to the end-device via re-route information 512 several minutes before the peak jump. In turn, the edge router can leverage the path information from path selection engine 506 to switch to a better path before the expected peak period. This can also be done on a per-application basis where a path is switched only to application-classes that are sensitive to the predicted high values of KPIs of the current path.

In another embodiment, proactive path correction engine 508 may update the routing policy of a router via re-route information 512, to trigger alternative routes during predicted seasonal peaks.

Figure 8:
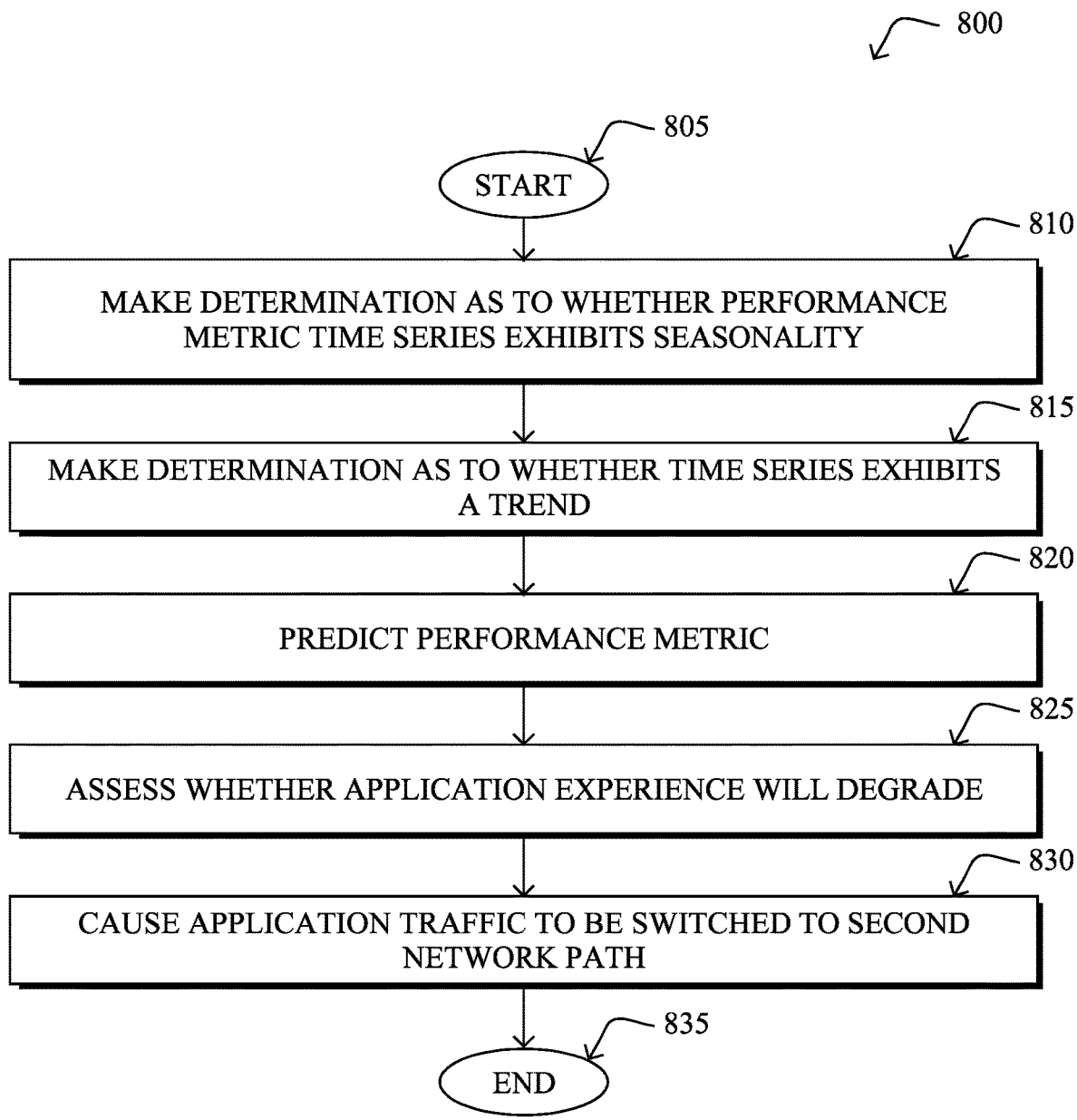
FIG. 8 illustrates an example simplified procedure for rerouting SaaS traffic.

FIG. 8 illustrates an example simplified procedure for rerouting SaaS traffic, in accordance with one or more embodiments described herein. For example, a non-generic, specifically configured device (e.g., device 200), such as a network router or other device in communication therewith, may perform procedure 800 by executing stored instructions (e.g., process 248). The procedure 800 may start at step 805, and continues to step 810, where, as described in greater detail above, the device may make a first determination as to whether a time series of a performance metric for a first network path exhibits seasonality. The device may obtain such a time series information through BFD probing, HTTP ping messages, or the like. For instance, the performance metric may comprise one of: latency, jitter, loss, or throughput. In some embodiments, the device may make the first determination using one of: a seasonality-trend decomposition, a partial auto-correlation function, or a power spectrum using a Fast Fourier Transform. n further embodiments, the device may make the first determination using a machine learning-based classification model trained to label a time series as seasonal or non-seasonal. In additional embodiments, the device may also compute a peak interval, peak height, or significance associated with the seasonality, should it determine that seasonality exists.

At step 815, as detailed above, the device may make a second determination as to whether the time series exhibits a trend. In one embodiment, the device may do so by applying Seasonal and Trend decomposition using Loess (STL) to the time series. In another embodiment, the device may do so using a machine learning-based classifier trained to detect trends (e.g., upward trends, downward trends, etc.).

At step 820, the device may predict, based on the first determination and on the second determination, the performance metric for the first network path during a future time period, as described in greater detail above. In various embodiments, such a prediction may also be based on any or all of the following: a peak interval, peak height, and/or measure of significance for any seasonality of the time series. In further embodiments, the prediction may also be based on any or all of the following: a slope and/or measure of significance for any trend exhibited by the time series.

At step 825, as detailed above, the device may assess, based on the performance metric predicted for the first network path, whether a measure of application experience will degrade for application traffic sent via the first network path. In some embodiments, the device may do so by comparing the performance metric predicted for the first network path to an SLA associated with the application traffic.

At step 830, the device may cause the application traffic to be proactively switched to a second network path, when the measure of application experience is expected to degrade, as described in greater detail above. For instance, the device may opt to switch the application traffic from a public Internet path (e.g., a tunnel, etc.) to a business Internet or MPLS path. In various embodiments, the device may do so in part by predicting the performance metric for the second network path during the future time period, such as to ensure that switching/re-routing the traffic onto the second path will not result in worse performance than that of the first path. In some embodiments, the device may also guard against path oscillations by determining whether switching the application traffic will result in the application traffic being later switched back onto the first network path in an oscillating manner. Procedure 800 then ends at step 835.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce systems and methods to detect predictable seasonal and trend changes in the network KPIs of a path by utilizing several probes that measure path health. In some aspects, the techniques herein may utilize statistical and/or machine learning techniques to predict path deterioration and correlate the degradation of path characteristics (e.g., seasonal peaks) to application experience. The techniques also allow for best path selection that considers the predicted deterioration of the path and proactively selects other paths that are predicted to provide better experience. Upon finding such a better path, the application traffic can be rerouted proactively, before the path deteriorates and application experience is hampered.

While there have been shown and described illustrative embodiments that provide for proactive routing, it is to be understood that various other adaptations and modifications may be made within the spirit and scope of the embodiments herein. For example, while certain embodiments are described herein with respect to using certain models for purposes of predicting path KPIs, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
making, by a device, a first determination as to whether a time series of a performance metric for a first network path exhibits seasonality by performing an analysis of the performance metric over time;
making, by the device and based on the analysis of the performance metric, a second determination as to whether the time series exhibits a trend in which the performance metric increases or decreases over time;
predicting, by the device and based on the first determination and on the second determination, the performance metric for the first network path during a future time period;
assessing, by the device and based on the performance metric predicted for the first network path, whether a measure of application experience will degrade for application traffic sent via the first network path; and
causing, by the device, the application traffic to be proactively switched to a second network path, when the measure of application experience is expected to degrade,
wherein making the first determination further comprises computing a peak interval, peak height, or significance associated with the seasonality.

2. The method as in claim 1, wherein the first network path is a public Internet path and the second network path is a business Internet or Multiprotocol Label Switching (MPLS) path.

3. The method as in claim 1, wherein the performance metric comprises one of: latency, jitter, loss, or throughput.

4. The method as in claim 1, wherein the first determination is made using a machine learning-based classification model trained to label a time series as seasonal or non-seasonal.

5. The method as in claim 1, wherein causing the application traffic to be proactively switched to a second network path, when the measure of application experience is expected to degrade, further comprises:
predicting the performance metric for the second network path during the future time period.

6. The method as in claim 1, wherein assessing whether the measure of application experience is expected to degrade for application traffic sent via the first network path comprises:
comparing the performance metric predicted for the first network path to a service level agreement (SLA) associated with the application traffic.

7. The method as in claim 1, wherein causing the application traffic to be proactively switched to a second network path, when the measure of application experience is expected to degrade, further comprises:
determining whether switching the application traffic will result in the application traffic being later switched back onto the first network path in an oscillating manner.

8. The method as in claim 1, wherein the device makes the first determination using one of: a seasonality-trend decomposition, a partial auto-correlation function, or a power spectrum using a Fast Fourier Transform.

9. The method as in claim 1, wherein the device makes the second determination using Seasonal and Trend decomposition using Loess (STL) or a machine learning-based classifier.

10. An apparatus, comprising:
one or more network interfaces;
a processor coupled to the one or more network interfaces and configured to execute one or more processes; and
a memory configured to store a process that is executable by the processor, the process when executed configured to:
make a first determination as to whether a time series of a performance metric for a first network path exhibits seasonality by performing an analysis of the performance metric over time;
make, based on the analysis of the performance metric, a second determination as to whether the time series exhibits a trend in which the performance metric increases or decreases over time;
predict, based on the first determination and on the second determination, the performance metric for the first network path during a future time period;
assess, based on the performance metric predicted for the first network path, whether a measure of application experience will degrade for application traffic sent via the first network path; and
cause the application traffic to be proactively switched to a second network path, when the measure of application experience is expected to degrade,
wherein the apparatus makes the first determination by computing a peak interval, peak height, or significance associated with the seasonality.

11. The apparatus as in claim 10, wherein the first network path is a public Internet path and the second network path is a business Internet or Multiprotocol Label Switching (MPLS) path.

12. The apparatus as in claim 10, wherein the performance metric comprises one of:
latency, jitter, loss, or throughput.

13. The apparatus as in claim 10, wherein the first determination is made using a machine learning-based classification model trained to label a time series as seasonal or non-seasonal.

14. The apparatus as in claim 10, wherein the apparatus causes the application traffic to be proactively switched to a second network path, when the measure of application experience is expected to degrade, by:
predicting the performance metric for the second network path during the future time period.

15. The apparatus as in claim 10, wherein the apparatus assesses whether the measure of application experience is expected to degrade for application traffic sent via the first network path by:
    comparing the performance metric predicted for the first network path to a service level agreement (SLA) associated with the application traffic.

16. The apparatus as in claim 10, wherein the apparatus causes the application traffic to be proactively switched to a second network path, when the measure of application experience is expected to degrade, by:
    determining whether switching the application traffic will result in the application traffic being later switched back onto the first network path in an oscillating manner.

17. The apparatus as in claim 10, wherein the apparatus makes the first determination using one of: a seasonality-trend decomposition, a partial auto-correlation function, or a power spectrum using a Fast Fourier Transform.

18. The apparatus as in claim 10, wherein the apparatus makes the second determination using Seasonal and Trend decomposition using Loess (STL) or a machine learning-based classifier.

19. A tangible, non-transitory, computer-readable medium storing program instructions that cause a device to execute a process comprising:
    making, by the device, a first determination as to whether a time series of a performance metric for a first network path exhibits seasonality by performing an analysis of the performance metric over time;
    making, by the device and based on the analysis of the performance metric, a second determination as to whether the time series exhibits a trend in which the performance metric increases or decreases over time;
    predicting, by the device and based on the first determination and on the second determination, the performance metric for the first network path during a future time period;
    assessing, by the device and based on the performance metric predicted for the first network path, whether a measure of application experience will degrade for application traffic sent via the first network path; and
    causing, by the device, the application traffic to be proactively switched to a second network path, when the measure of application experience is expected to degrade,
    wherein making the first determination further comprises computing a peak interval, peak height, or significance associated with the seasonality.

* * * * *

UNITED STATES PATENT AND TRADEMARK OFFICE
CERTIFICATE OF CORRECTION

PATENT NO. : 11,398,959 B2
APPLICATION NO. : 16/991717
DATED : July 26, 2022
INVENTOR(S) : Yelahanka Raghuprasad et al.

It is certified that error appears in the above-identified patent and that said Letters Patent is hereby corrected as shown below:

In the Specification

Column 1, Line 24, please amend as shown:
resulting virtualization of services has led to a dramatic Column 3, Line 5, please amend as shown:
network backbone 130. For example, routers 110, 120

Column 3, Line 46, please amend as shown:
may be connected to network 100 via PE-3 and via a Column 4, Line 59, please amend as shown:
physical links coupled to the network 100. This network Column 7, Line 24, please amend as shown:
200) located at the edge of a remote site 302 may provide Column 7, Line 62, please amend as shown:
narios are also possible, such as using Colo, accessing SaaS Column 8, Line 17, please amend as shown:
in FIGS. 3A-3B, and the like.

Column 8, Line 53, please amend as shown:
intervals. This presents some opportunity to leverage Column 9, Line 55, please amend as shown:
resulting path information 510 used to build and refresh Signed and Sealed this
Eighteenth Day of October, 2022

Katherine Kelly Vidal
*Director of the United States Patent and Trademark Office*

CERTIFICATE OF CORRECTION (continued)
U.S. Pat. No. 11,398,959 B2

Column 10, Line 9, please amend as shown:
paths to certain routers if the KPIs or seasonality/trend Column 11, Line 7, please amend as shown:
telemetry 504a. If so, seasonality/trend detection engine 504c Column 11, Line 27, please amend as shown:
sonality/trend detection engine 504c can then detect a monotonic Column 11, Line 41, please amend as shown:
Seasonality Indicator—this may take the form of a Boolean Column 13, Line 17, please amend as shown:
may use the information generated by path selection Column 13, Line 59, please amend as shown:
using a Fast Fourier Transform. In further embodiments, the